United States Patent [19]

Delluc

[11] Patent Number: 4,513,041

[45] Date of Patent: Apr. 23, 1985

[54] TUBULAR VACUUM-TIGHT ENCLOSURES FOR THERMAL AND ACOUSTICAL INSULATING PANELS

[76] Inventor: Rene E. Delluc, 2, Square du Berry, 91 300 Massy, France

[21] Appl. No.: 522,850

[22] Filed: Aug. 12, 1983

[51] Int. Cl.³ .............................................. B32B 3/00
[52] U.S. Cl. .................... 428/69; 181/288; 181/294; 428/76; 428/200; 428/920
[58] Field of Search .................... 428/69, 72, 76, 920, 428/200, 43; 181/284, 288, 294

[56] References Cited

U.S. PATENT DOCUMENTS

| | | | |
|---|---|---|---|
| 4,038,447 | 7/1977 | Brock | 428/72 |
| 4,228,869 | 10/1980 | Bschorr | 181/286 |

FOREIGN PATENT DOCUMENTS 2629171 12/1978 Fed. Rep. of Germany ........ 428/69

*Primary Examiner*—Paul J. Thibodeau
*Attorney, Agent, or Firm*—Darby & Darby

[57] ABSTRACT

This invention relates to vacuum-tight tubular enclosures, made of plastic material and designed for making up insulating panels. Each vacuum cell is composed of a rigid plastic tube (1), both ends of which are closed by perforated plugs (3). This tube is placed in a thin flexible sheath (6) of highly impervious plastic material, preferably polyvinylidene or a derivative of polyvinylidic alcohol. This sheath extends beyond both ends of the rigid tube and is sealed by welding after the rigid tube has been evacuated to a high vacuum, namely less than $10^{-3}$ mm Hg. The extensions of the sheath are flattened and joined together by seams in a grid pattern so as to form offset rows of alveoles (11) for effectively preventing air leaks into the evacuated tube.

This invention also relates to thermal and/or acoustic insulating panels in which evacuated cells (18, FIG. 9) of the above design are inserted, preferably in overlapping layers. Preferably, the panel is made of several layers of insulating alveolar material, and at least one such layer (12, FIG. 8) is provided with recesses matching the shape of the vacuum cells.

10 Claims, 9 Drawing Figures

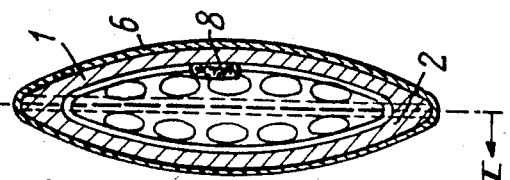
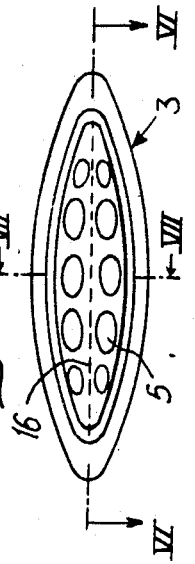
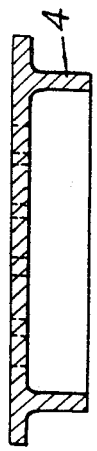
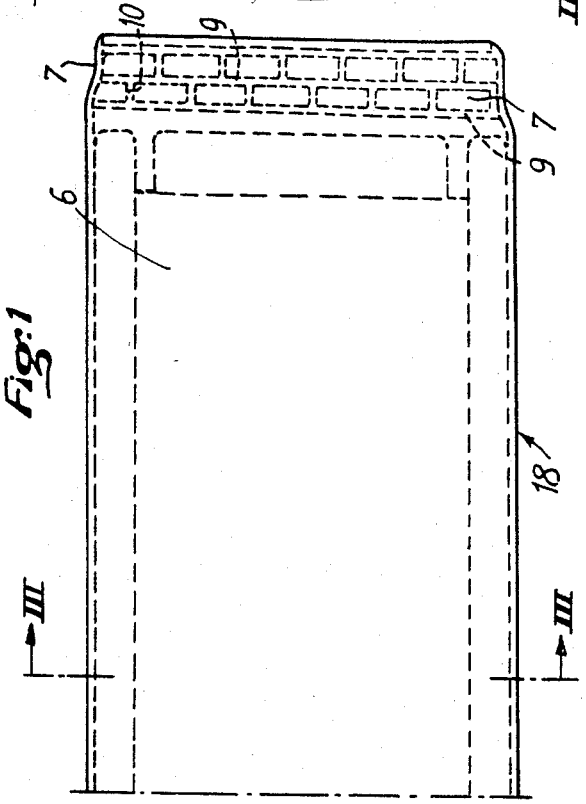
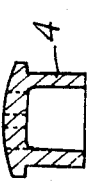
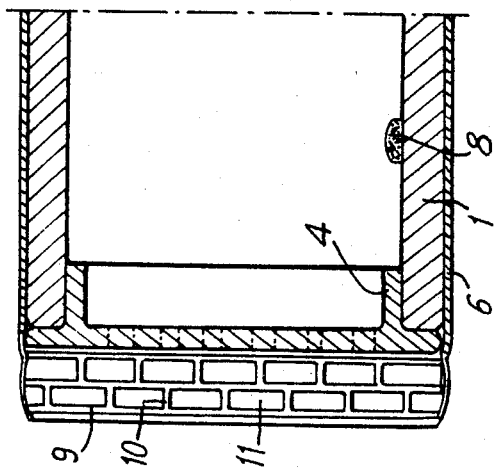
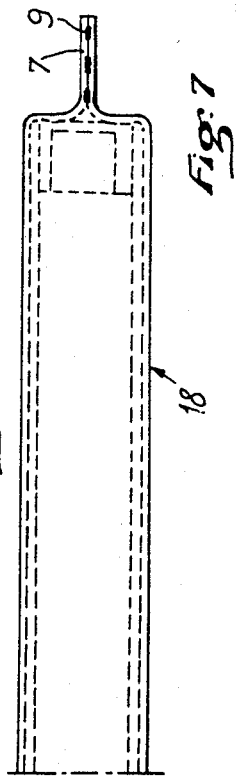

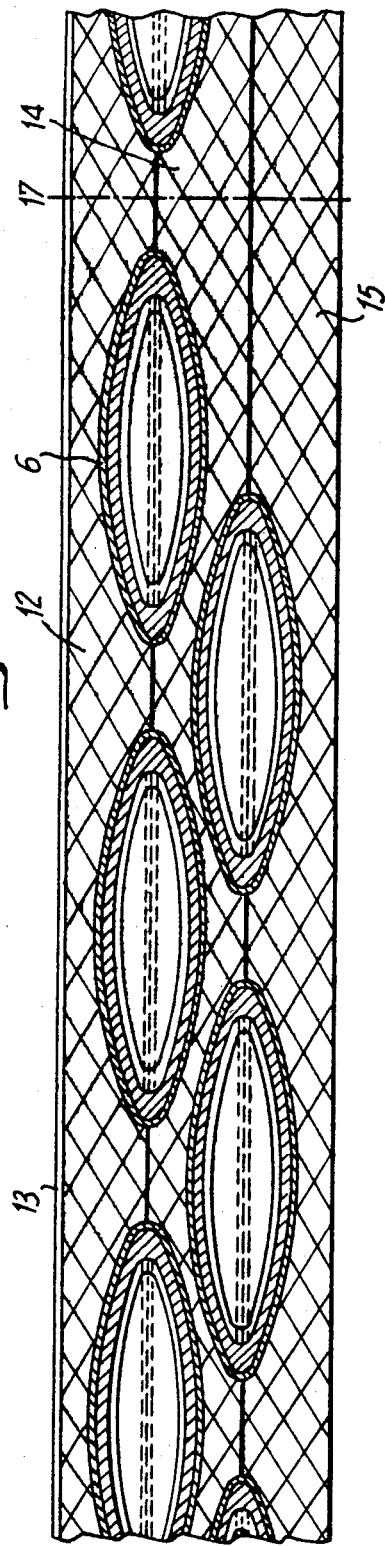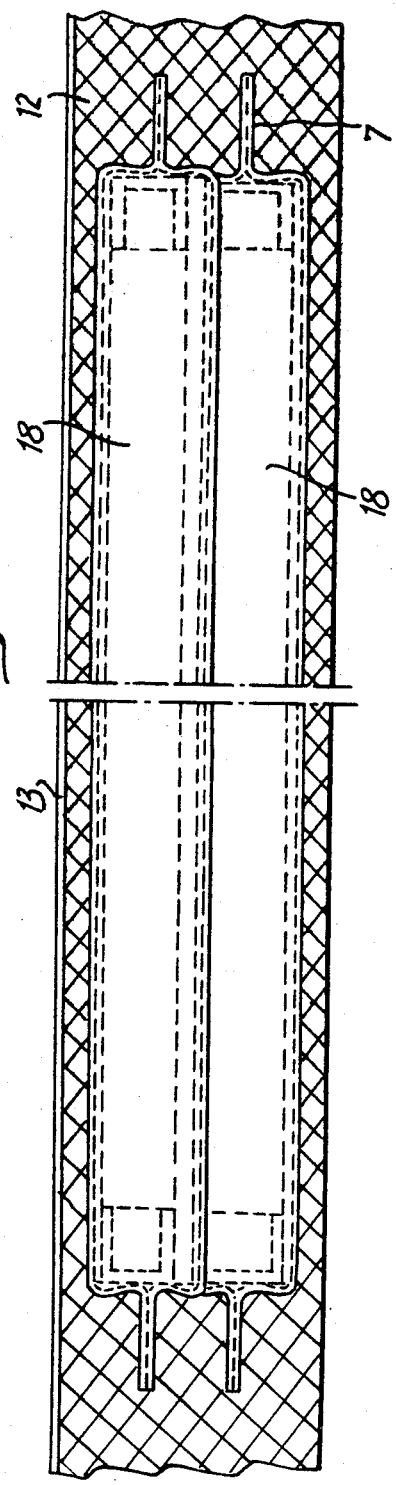

TUBULAR VACUUM-TIGHT ENCLOSURES FOR THERMAL AND ACOUSTICAL INSULATING PANELS

This invention relates to tubular vacuum-tight cells or enclosures, made of plastic material, designed for making thermal and acoustical insulating panels. It also relates to insulating panels obtained by incorporating therein such tubular vacuum enclosures. A first purpose of this invention is to achieve insulating panels having a high insulating power, together with a light weight, and a slight thickness without being fragile.

A second purpose of this invention is to make it possible to manufacture such vacuum-tight cells and insulating panels by means of inexpensive methods which are already well proven in industrial applications.

The enclosures and insulating panels according to this invention may advantageously be used for insulating freezing tunnels and cold-storage cabinets, and also for protecting the roofs of vehicles against intense solar radiation, particularly in hot countries. They are also effective for soundproofing purposes.

BACKGROUND OF THE INVENTION

The ideal solution for achieving utmost insulation against heat transfer and sound transmission consists in using a double-wall vacuum-tight casing, in which a high vacuum of less than 0.1 pascal, that is less than $10^{-3}$ torr, can be created and maintained for a very long period. It is known that the heat transfer factor across a double-wall casing of this kind is very close to zero, while its acoustic transmission factor is practically nil.

However, this solution which is well known and is used for the storage and shipping of cryogenic liquids, and also for carrying around hot or refrigerated beverages in containers known as "Thermos" vessels, implies a relatively heavy and costly structure, when it is made of metal, or a fragile structure when glass is used. Also, such a structure runs the risk of loosing all its useful properties through a single puncture or fissure.

It has therefore already been proposed to produce a casing of this kind by incorporating, between panels of alveolar material, hollow tubular elements inside which a high vacuum has been created. Insulating panels of this type have been described in French Pat. No. 1,284,186 of Johns-Manville and No. 1,255,980 of Yuen, and in the German Pat. No. 2,629,171 of Rodrian. However, in these three earlier patents, the vacuum tubes or enclosures are either metallic or made of glass, and when plastic tubes are mentioned, no means are indicated for achieving an easy and effective sealing of these tubes, nor for ensuring their vacuum tightness in the course of time.

As regards freezing tunnels, cold-storage cabinets and sound-proofing enclosures, which have been mentioned hereinabove, these devices are usually insulated by means of mats of glass fibers or panels of alveolar material which generally fail to prevent a substantial transmission of heat.

Similarly, the problem of providing protection against intense solar radiation striking upon the metal structure of the roof of an automobile, of a caravan or a truck being used in a hot country, had not yet been satisfactorily solved. Also, similar problems arise when dealing with the soundproofing of cabins for listening to music, or of rooms which require to be protected against external noise. A further similar problem relates to soundproof enclosures which are increasingly being required in the case of very noisy machines, such as paperboard corrugating machines, etc.

It is a purpose of this invention to achieve tubular vacuum-tight enclosures having a high thermal and acoustic insulating power for bringing a better solution to the above-mentioned problems.

SUMMARY OF THE INVENTION

This invention relates to tubular vacuum-tight enclosures, made of plastic material, designed for being incorporated into thermal and acoustic insulating panels. It also relates to insulating panels produced by inserting therein such tubular vacuum-tight enclosures.

It is a purpose of this invention to achieve inexpensive vacuum-tight hollow elements which are not fragile and can be readily manufactured using ordinary industrial methods, and in which a high vacuum (with a pressure of less than 0.1 pascal) can be maintained reliably in the course of time.

A first feature of this invention is that these elements, forming individual vacuum-tight enclosures, are in the form of rigid tubes covered externally with a sheath formed of a sheet or film of a plastic material such as polyvinylidene (PVD) or polyvinylidic alcohol. It is well known that these materials, in the form of sheets or films, offer a practically total and long-lasting tightness to gases and can readily be sealed, using conventional soldering methods.

Another feature of this invention aims at facilitating industrial production of such tubular elements by using rigid elongated tubes, the cross-section of which is preferably oval or elliptic, while the ends of these tubes are strengthened by suitable perforated plugs inserted therein and the flexible sheaths are designed with a length greater than that of the rigid tubes, so that a sheath may readily be soldered by flattening its ends together over both ends of a rigid tube.

Preferably, the flexible sheath is sealed in vacuum-tight manner after a high vacuum has been created inside the rigid tube, by forming in this sheath at least two welded seams, one parallel to the median plane extending along the longer axis of the elliptic cross-section of the rigid tube, and the other across the length of this tube, beyond one or both of its ends.

A further object of this invention is to provide an insulating panel by inserting therein vacuum-tight enclosures of the kind described hereinabove, this panel being formed of at least two plates of alveolar material, at least one of said plates presenting recesses matching the shape of the said vacuum enclosures.

Further features and advantages of this invention will emerge from the following detailed description, with reference to the appended drawings showing preferred embodiments of the invention, in which:

FIG. 1 is a plane view of a portion of a tubular element;

FIG. 2 is a longitudinal cross-section along line II—II of FIG. 3;

FIG. 3 is a cross-section view along line III—III of FIG. 1;

FIG. 4 represents a portion of a tubular element, showing how one end of the sheath has been flattened for making its soldering easy;

FIG. 5 shows a perforated plug, seen from the inside of the tubular element;

FIG. 6 is a cross-sectional view of this same plug along line VI—VI of FIG. 5;

FIG. 7 is another cross-sectional view of this same plug along line VII—VII of FIG. 5;

FIG. 8 is a cross-sectional view of an insulating panel obtained by incorporating vacuum tubes therein, showing a preferred staggered arrangement of these tubes between alveolar plates;

FIG. 9 is a longitudinal profile view of two adjacent elements in such a panel, assuming that the alveolar material has partly been removed.

DETAILED DESCRIPTION OF THE INVENTION

Referring to FIG. 1, this shows a preferred embodiment in which the hollow bodies are elongated tubular elements having an elliptic cross-section. Each element comprises a tube of rigid plastic material such as polyvinyl chloride (PVC), polyvinylidene (PVD) or any other suitable rigid plastic material which can readily be freed of dissolved gases and which is per se substantially gas-tight. These elements are obtained by means of ordinary extrusion methods and are cut at the required length. They may be rectilinear or more or less bent at an angle, according to the application for which these elements are intended. Their cross-section is preferably elliptic, as shown by FIGS. 3 and 8, while the wall thickness may be non-uniform, as for instance when a thicker wall is provided at both ends 2 (FIG. 3) of the longer axis of the ellipse, in order to increase crush resistance.

Both ends of this tube are sealed with a perforated plug 3 (FIGS. 5 to 7) comprising a peripheral rim 4 (FIG. 2) which may be press-fitted into the tube. Perforations 5 (FIG. 5) are distributed on both sides of a median line 16 located approximately along the longer axis of the ellipse formed by the cross-section of the tube.

The rigid tube 1 is placed within a casing or sheath 6 formed of a flexible sheet of plastic material, namely polyvinylidene (PVD) or a derivative of polyvinylidic alcohol, which may be produced by ordinary extrusion or extrusion-plus-inflation methods in the form of a sleeve, the length of which should exceed the length of the rigid tube over which it is to be wrapped. Products of this kind are known to have, under this form of sheets or films, very high imperviousness to gases, while they can be easily welded.

The length of the sheath extends beyond both ends of the rigid tube, so that the edges of this sheath can be flattened together along the median plane 16 of the tube. The elliptic cross-section of the rigid element 1 makes it easy to fold back the edges of the sheath, so that after evacuating the tubular cell to a high vacuum, it will be easy to seal these flattened ends, using a conventional welding method.

One of the tips 7 of the sheath may be welded prior to evacuating the vacuum cell.

The evacuation of these cells is carried out with conventional methods and will not be further described here, since it does not form a part of the invention per se. However, since the residual pressure within the tubes should not exceed $10^{-3}$ torr, that is 0.1 pascal, and while this is readily obtainable through conventional methods, it is nevertheless preferable that the material of the rigid tubes should be thoroughly freed of dissolved gases and it is advisable to place within the tube a small tablet 8 of activated charcoal or any other suitable material for absorbing any residual gases that might be released from the walls of the rigid tubes.

The joining of the terminal edges of the sheath is made after the perforated plugs 3 have been inserted under both back-folded ends 7 of the flexible sleeve 8. This joining is made by means of any conventional method, such as high-frequency electric heating. For achieving a complete and permanent vacuum-tight seal, the joining pattern may comprise two or three lateral seams 9 connected together by transversal seams 10 (FIG. 2) integral with seams 9 so as to form a set of enclosed areas or alveoles 11. It will be readily apparent that a possible defect of the sealed joint would not allow air to leak into the evacuated enclosure, since the seams are arranged in a grid pattern.

For avoiding any strain which might be caused by external air pressure, the interior lateral seam 9 leans against the median line 16 of the plug 3 which has no perforations in that part.

After the evacuating and sealing operations, such tubular elements 18 may be placed between layers of alveolar material, as shown at 12, 14 and 15 in the example of FIG. 8, for forming a thermal and acoustic insulating panel.

The alveolar plates, made of rigid plastic foam such as expanded polyethylene, polyurethane or a phenolic resin, are preferably molded so as to present recesses designed for housing the vacuum-tight tubular elements 18. The effectiveness of these panels may be further increased by providing two or more layers of vacuum tubes and by arranging these tubes in a staggered pattern, so that elements 18 of one layer overlap respectively with the gaps between elements 18 of the next layer, as shown by FIG. 8.

The set of alveolar plates is preferably glued onto the tubular elements 18. According to the various utilizations being considered, one of the external faces of the panel may be covered with a sheet 13 which is either metallic or made of flexible plastic material coated with a metal film for reflecting radiations.

In order to provide for an easier cutting of the panel without damaging the vacuum tubes, areas 17 (FIG. 8) may be provided which do not contain any vacuum tubes 18.

Panels fabricated in this manner may be designed with any desirable shape, either planar, primatic or cylindrical, etc. so as to fit the walls of the various enclosures around which they are to be installed for insulating purposes.

What is claimed is:

1. A cell for insulating panels comprising:
   plastic gas impervious flexible sheath, having first and second sealed ends; and
   at least one rigid hollow, plastic tubular element having first and second ends, said tubular element being disposed within said sheath;
   wherein said sealed sheath and tubular element have been substantially evacuated.

2. The cell according to claim 1 wherein said flexible sheath is comprised of a material of the group comprising polyvinylidene (PVD) and polyvinylidic alcohol derivatives.

3. The cell according to claim 1 further comprising perforated plugs disposed in said first and second element ends, whereby said plugs are not impervious to gases.

4. The cell according to claim 3, in which said impervious flexible sheath covers said plugs and extends beyond both ends of the rigid tubular element, the ends of these extensions of said sheath being joined together along a median plane of said rigid tubular element, said sheath being tightly sealed, after the tubular element has been evacuated, by means of at least two welded seams, respectively parallel and perpendicular to the longitudinal axis of said rigid tubular element, said seams being arranged in a grid pattern so as to form a set of closed alveoles.

5. The cell according to claim 3, wherein said tubular elements have an elliptical cross section.

6. An insulating panel comprising:
  at least two plates of alveolar insulating material, wherein at least one of said plates includes recesses of a predetermined shape; and
  a plurality of cells having said predetermined shape and disposed in said recesses, said cells being comprised of;
  plastic, gas impervious, flexible sheaths having first and second sealed ends; and
  at least one rigid, hollow, plastic tubular element having first and second ends, said tubular element being disposed within said sheaths;
  wherein said sealed sheath and tubular element have been substantially evacuated.

7. The insulating cell according to claim 6 wherein said flexible sheath is comprised of a material selected from the group comprising polyvinylidene (PVD) and polyvinylidic alcohol derivatives.

8. The insulating panel according to claim 6 wherein said cells further comprise perforated plugs disposed in said first and second element ends, whereby said plugs are not impervious to gases.

9. The insulating panel according to claim 8 wherein said impervious, flexible sheath covers said plugs and extends beyond both ends of said rigid tubular elements, said ends of these extensions of said sheaths being joined together along a median plane of said rigid tubular elements, said sheath being tightly sealed by means of at least two welded seams respectively parallel and perpendicular to said longitudinal axis of said rigid tubular element, said seam being arranged in a grid pattern so as to form a closed set of alveoles, said tubular element being substantially evacuated.

10. The insulating panel according to claim 9 wherein said tubular elements have an elliptical cross section and said recesses of predetermined shape have a matching elliptical cross section.

* * * * *